United States Patent [19]
Echelberger

[11] Patent Number: 5,255,769
[45] Date of Patent: Oct. 26, 1993

[54] DISCHARGE CHUTE FOR TRASH RECEPTACLES

[76] Inventor: Michael G. Echelberger, Box 333, 608 N. 2nd St., Rockwell, Iowa 50469

[21] Appl. No.: 846,219

[22] Filed: Mar. 4, 1992

[51] Int. Cl.⁵ .............................................. B65G 11/00
[52] U.S. Cl. .................................... 193/4; 193/25 A; 193/33; 222/570
[58] Field of Search ................... 193/2 R, 4, 25 A, 33, 193/2 D, 2 A; 222/566, 567, 569, 570

[56] References Cited

U.S. PATENT DOCUMENTS

| | | | |
|---|---|---|---|
| 1,298,031 | 3/1919 | Fromhagen | 222/570 X |
| 1,961,307 | 6/1934 | Stauffer | 193/4 |
| 3,095,073 | 6/1963 | Larson et al. | 193/33 |
| 3,400,867 | 9/1968 | Giannone | 222/570 |
| 3,428,226 | 2/1969 | Lanahan | 222/569 |
| 3,612,515 | 10/1971 | Bergeson | 193/2 R X |
| 4,299,340 | 11/1981 | Hrytzak | 222/570 X |

FOREIGN PATENT DOCUMENTS

| | | | |
|---|---|---|---|
| 0212909 | 3/1987 | European Pat. Off. | 193/33 |
| 0403847 | 12/1990 | European Pat. Off. | 193/2 R |
| 1052038 | 1/1954 | France | 222/570 |

*Primary Examiner*—Robert P. Olszewski
*Assistant Examiner*—James R. Bidwell
*Attorney, Agent, or Firm*—James C. Nemmers

[57] ABSTRACT

A discharge chute for emptying the debris from trash receptacles, especially receptacles of a cylindrical shape and which have a normally closed clean-out opening in the sidewall near the bottom of the receptacle. The chute has a downwardly extending lip that engages the front edge of the opening in the trash receptacle and outwardly extending tabs that clip behind the sidewall of the receptacle adjacent the opening so as to secure the chute in place during use.

1 Claim, 1 Drawing Sheet

DISCHARGE CHUTE FOR TRASH RECEPTACLES

BACKGROUND OF THE INVENTION

Many receptacles are portable and have lids that are removable when waste is placed in the container or when the container is emptied. However, there are some situations where a receptacle for collecting waste is permanently attached to a support and is emptied by opening an access door in the sidewall near the bottom of the receptacle. For example, car washing facilities usually provide the user with a vacuum station in which large commercial vacuum cleaners are available to clean the interior of the user's vehicle. These vacuum cleaners usually have large permanently mounted receptacles into which the debris falls. In order to clean out these large receptacles, which are usually cylindrical in shape, an access door is provided in the sidewall near the bottom. The access door is, of course, normally closed, and then removed when it becomes necessary to clean out the debris from the receptacle. Although this is seemingly an easy task, the clean-out opening in the sidewall is usually a few inches above the bottom of the receptacle, thus making it more difficult to remove the debris that has accumulated in the bottom. Cleaning out of the receptacles becomes a messy and somewhat difficult task, and the persons whose job it is to clean out such receptacles have resorted to a variety of methods in an attempt to simplify the task. None of the known methods have been satisfactory, and the task remains an undesirable one.

There is therefore a need for a device that will simplify the task of removing debris from the bottom of large receptacles having clean out openings in the sidewall. Any such device must be simple, easy to use, and inexpensive.

SUMMARY OF THE INVENTION

The device of the invention is a simple chute that is quickly and easily attached to and removed from the clean-out opening in a large receptacle containing debris. The chute has tabs extending outwardly from its sides and which are engageable behind the wall of the receptacle so that the chute will be held in place during use. These tabs are combined with a downwardly extending lip that engages the bottom edge of the clean-out opening to lock the chute in place. This frees the hands of the user to push the debris up on top of the chute from where it can be pushed into a portable refuse container. Because the chute is made of flexible material, it can be easily installed and removed after use.

DESCRIPTION OF THE PREFERRED EMBODIMENT OF THE INVENTION

Figure 1:
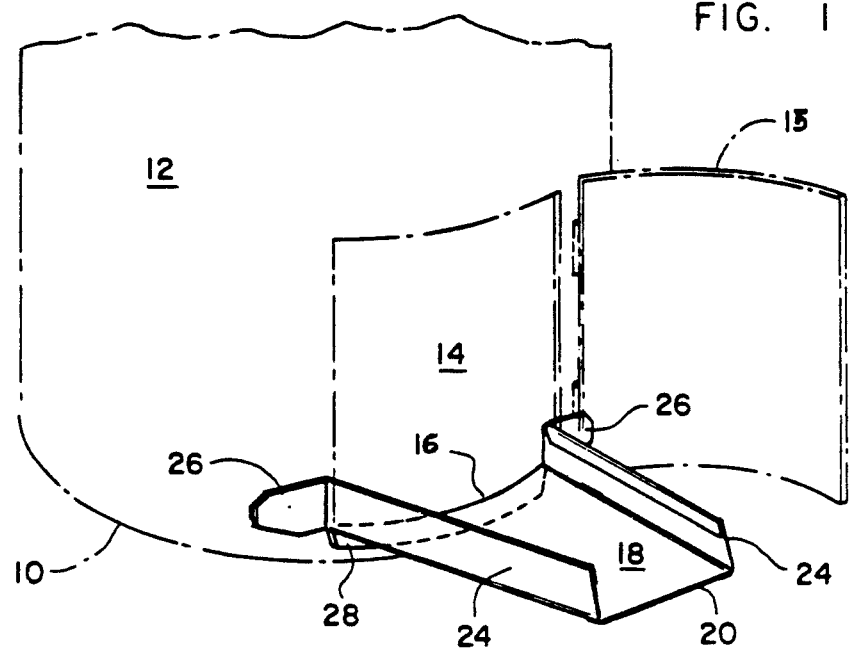
FIG. 1 is a perspective view showing the device of the invention installed in a clean-out opening.
Figure 2:
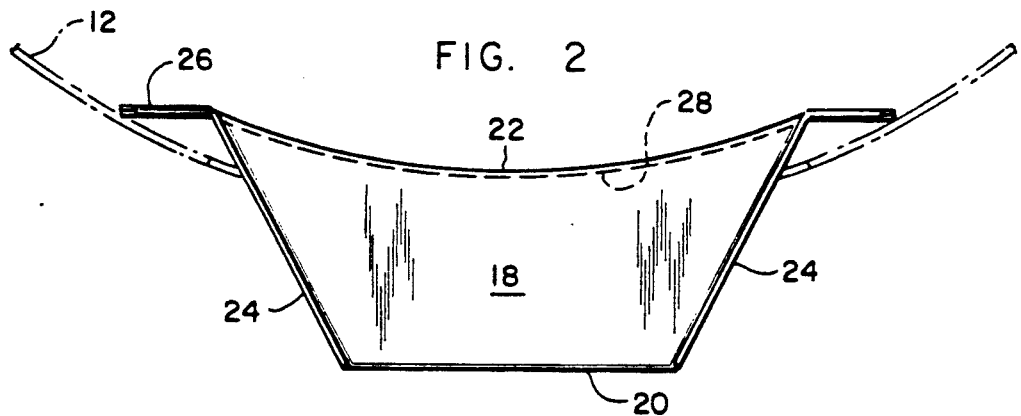
FIG. 2 is a top view of the device of the invention.
Figure 3:
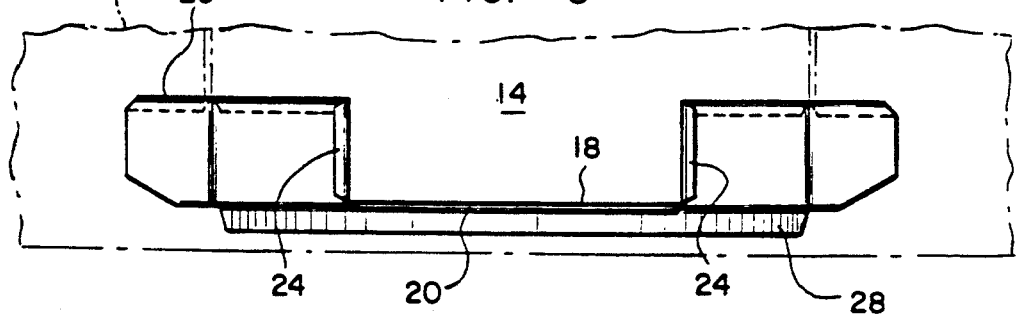
FIG. 3 is an elevational view of the device viewing it from the front.

As illustrated in the drawings, the chute of the invention is designed primarily for assisting in the removal of debris from a large cylindrical-shaped receptacle that collects the debris from commercial vacuum cleaners such as those commonly seen at car washes. These large cylindrical-shaped receptacles commonly are secured to a supporting base (not shown) and have a bottom wall 10 joined to a circular sidewall 12 which has a clean-out opening 14 that is normally closed by a door 15 that may be removable. Opening 14 is usually rectangular in shape and is located a slight distance above the bottom wall 10, thus leaving a ledge 16 which is that portion of the sidewall 12 between the bottom wall 10 and the bottom edge of the opening 14. This ledge 16 makes it more difficult to easily clean out the debris collected inside of the receptacle. Normally, clean out is accomplished by use of a small scoop or shovel or anything else that is available to physically pick up the debris so that it can be placed in a refuse container. Frequently, operators of commercial car washes which have vacuum cleaners will use their hands to clean out the debris that is collected in the receptacle connected in the vacuum system. Obviously, this is an unpleasant and messy task, and not infrequently, some of the debris is spilled while it is being carried through the opening 14 into a refuse container for disposal.

The chute of the invention facilitates removal of the debris by providing a simple means for containing the debris while it is being removed from the receptacle through the opening 14 and placed in a refuse container. The chute thus includes a bottom wall 18 which has a front edge 20 slightly narrower in width than the rear edge 22. The rear edge 22 is curved to conform to the curved shape of the sidewall 12 of the vacuum cleaner receptacle. Obviously, if the vacuum cleaner receptacle has a flat sidewall through which opening 14 extends, the rear edge 22 would be straight.

Formed along each side of the bottom wall 18 of the chute are side flanges 24 which extend upwardly and which are preferably formed integrally with the bottom wall 18. The rear portions of the side flanges 24 are bent or otherwise formed so as to extend outwardly to provide retaining tabs 26. Also, the rear edge 22 of the bottom wall 18 is bent downwardly at approximately a right angle to form a retaining lip 28. The width of the rear edge 22 of the bottom wall 18 is approximately the same as the width of the opening 14. Also, the chute of the invention is preferably formed of plastic or light gauge metal which can be bent slightly without breaking or becoming deformed. Thus, the chute of the invention can be inserted into the opening 14 by bending the chute slightly and tipping it at an angle so that it can extend through the opening 14 a sufficient distance until the retaining tabs 26 can engage the inside of the sidewall the invention is thus installed in the opening 14, it will be locked in place and free the hands of the user to empty the debris.

In use, the access door to the receptacle is first removed, and the chute is then inserted into the opening 14, rear edge 22 first. Installation is facilitate by tipping the chute at an angle and flexing it a sufficient amount so that the retaining tabs 26 extend through and inside of the opening 14. The chute is then moved until the retaining lip 28 engages the front of the ledge 16, and with the tabs 26 engaged along the inside of the sidewall 12 adjacent to the opening 14, the chute will be locked in place. This frees the hands of the user to sweep or otherwise scrape or push the debris from the receptacle onto the chute and into a refuse container with the front edge 20 extending over the refuse container. When the debris has been removed from the receptacle, the chute is easily removed by squeezing it to unlock it and then tipping it and withdrawing it through the opening 14.

The chute can be inexpensively produced by stamping it from a flat piece of sheet metal, such as 18 gauge galvanized sheet metal. The side flanges 24, retaining lip 28 and retaining tabs 26 are then formed by appropriate bends. If desired, the top edges of the side flanges 24 as well as the front edge 20 can be strengthened by bending the sheet metal 180 degrees to form a rounded edge. Of course, the chute could also be formed from a sheet of plastic or other suitable material.

Having thus described the invention in connection with the preferred embodiment thereof, it will be evident to those skilled in the art that various revisions and modifications can be made to the preferred embodiment without departing from the spirit and scope of the invention. It is my intention, however, that all such revisions and modifications as are obvious to those skilled in the art will be included within the scope of the following claims.

What is claimed as follows:

1. A detachable discharge chute for emptying debris from a trash receptacle having a side wall with a rectangular-shaped clean out opening in the side wall, said discharge chute comprising a bottom wall having a rear edge and a front edge, spaced apart side flanges extending upwardly from the bottom wall to form with the bottom wall a chute over which the debris can be removed, a rear portion of each side flange extending rearwardly from the rear edge of the bottom wall and then outwardly from the flange to form a retaining tab, the rear edge of the bottom wall being shaped to conform to the shape of the outside surface of the side wall of the trash receptacle, and a retaining lip extending downwardly from the bottom wall along the rear edge of the bottom wall forwardly of the retaining tabs, the retaining lip being engageable with the outside surface of the side wall of the receptacle just beneath and along the bottom edge of the clean out opening and the retaining tabs being engageable with the inside surface of the side wall of the receptacle inside of the clean out opening adjacent to the side edges of the opening so as to retain the discharge chute in place when installed in the clean out opening of the receptacle, the chute being formed of a single piece of material that is rigid but which has some resiliency to permit the chute to be bent a limited amount without deformation thereby allowing the chute to be repeatedly installed in and detached from the clean out opening of the receptacle.

* * * * *